(12) United States Patent
Rathore et al.

(10) Patent No.: US 11,934,183 B2
(45) Date of Patent: Mar. 19, 2024

(54) METHOD AND SYSTEM FOR INDUSTRIAL ANOMALY DETECTION

(71) Applicant: Tata Consultancy Services Limited, Mumbai (IN)

(72) Inventors: Pradeep Rathore, Pune (IN); Arghya Basak, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 353 days.

(21) Appl. No.: 17/596,568

(22) PCT Filed: Jun. 12, 2020

(86) PCT No.: PCT/IN2020/050521
§ 371 (c)(1),
(2) Date: Dec. 13, 2021

(87) PCT Pub. No.: WO2020/250247
PCT Pub. Date: Dec. 17, 2020

(65) Prior Publication Data
US 2022/0317669 A1 Oct. 6, 2022

(30) Foreign Application Priority Data
Jun. 13, 2019 (IN) .............................. 201921023497

(51) Int. Cl.
*G05B 23/02* (2006.01)
*G05B 19/418* (2006.01)

(52) U.S. Cl.
CPC ....... *G05B 23/024* (2013.01); *G05B 19/4183* (2013.01); *G05B 19/4184* (2013.01)

(58) Field of Classification Search
CPC .... G05B 23/024; G05B 19/4183; G06F 30/27
See application file for complete search history.

(56) References Cited

U.S. PATENT DOCUMENTS

| 9,021,938 B2 | 5/2015 | Duvall et al. |
| 10,223,403 B2 | 3/2019 | Malhotra et al. |

(Continued)

OTHER PUBLICATIONS

Chong, Adrian et al., "Imputation of Missing Values in Building Sensor Data", Building Performance Modeling Conference, Date: Sep. 2016, Publisher: ASHRAE and IBPSA Link: https://ideaslab.io/publication/pdf/chong-2016-missing.pdf.

(Continued)

*Primary Examiner* — Vincent H Tran
(74) *Attorney, Agent, or Firm* — FINNEGAN, HENDERSON, FARABOW, GARRETT & DUNNER LLP (57) ABSTRACT

The disclosure relates to anomaly detection in an industrial environment including multiple industrial units and systems, generating huge volume of data. The conventional methods rely only on sensor data alone. The techniques of handling missing data plays a crucial role in determining the performance of industrial anomaly detection system. Further, imputation of missing data could cause error in computation, thus affecting the accuracy of the industrial anomaly detection system. The present disclosure addresses the problems associated with missing data by utilizing a masking technique. Further, the present disclosure utilizes quantitative and qualitative metadata associated with industrial system along with the sensor data to improve anomaly detection performance. Furthermore, the present disclosure includes a model recommendation system which provides transfer learning based utilization of existing models for similar industrial systems.

20 Claims, 7 Drawing Sheets

(56) References Cited

U.S. PATENT DOCUMENTS

| | | |
|---|---|---|
| 10,291,506 B2 | 5/2019 | Mixer et al. |
| 2012/0041575 A1 | 2/2012 | Maeda et al. |
| 2012/0185516 A1 | 7/2012 | Xu |
| 2015/0033076 A1 | 1/2015 | Akiyama et al. |
| 2016/0261482 A1 | 9/2016 | Mixer et al. |
| 2016/0299938 A1 | 10/2016 | Malhotra et al. |

OTHER PUBLICATIONS

Luo, Tie et al., "Distributed Anomaly Detection Using Autoencoder Neural Networks in WSN for IoT", International Conference on Communications (ICC), Date: May 2018, Publisher: IEEE, https://arxiv.org/pdf/1812.04872.pdf.

Gugulothu, Narendhar et al., "Sparse Neural Network Based Anomaly Detection in Multi-Dimensional Time Series", AI4IOT Workshop at IJCAI, Date: Jul. 2018, Publisher: IJCAI, https://www.zurich.ibm.com/AI4IoT/2018/AI4IoT-18_Gugulothu.pdf.

Zhuang, Fuzhen et al., "Supervised representation learning: Transfer learning with Deep Autoencoders", Twenty-Fourth International Joint Conference on Artificial Intelligence, Date: 2015, IJCAI, https://www.ijcai.org/Proceedings/15/Papers/578.pdf.

Atluri, Gowtham et al., "Spatio-Temporal Data Mining: A Survey of Problems and Methods", ACM Computing Surveys, Date: Sep. 2018, vol. 51, Issue 4, Publisher: ACM, https://dl.acm.org/doi/10.1145/3161602.

International Search Report and Written Opinion dated Mach 24, 2021, in International Application No. PCT/IN2020/050521; 10 pages.

METHOD AND SYSTEM FOR INDUSTRIAL ANOMALY DETECTION

PRIORITY CLAIM

The present application is a U.S. National Stage Filing under 35 U.S.C. § 371 and claims priority from International Application No. PCT/IN2020/050521, filed on Jun. 12, 2020, which application claims priority from Indian Patent Application No. 201921023497, filed on Jun. 13, 2019. The entire contents of the aforementioned applications are incorporated herein by reference.

TECHNICAL FIELD

The disclosure herein generally relates to the field of anomaly detection, and, more particular, to a method and system for industrial anomaly detection.

BACKGROUND

Anomaly is any abnormal activity identified and industrial anomaly is any abnormality associated with any process and/or machinery of any industrial unit. Since the machineries and process of the industrial unit is working continuously, it is crucial to monitor the associated anomaly since it may lead to production loss, monetary loss as well as human causality. Anomaly associated with an industrial unit can be identified by monitoring the machinery and a process associated with the machinery closely.

Conventionally, the industrial unit is monitored by analyzing the data obtained from sensors. More often, some sensors will not be active and the missing data from the inactive sensor is imputed. The imputation creates error in the final output which affects accuracy of the anomaly detection system. Further if there is missing data while implementing the solution in real time, imputation becomes much more difficult and ineffective. Further, there is a challenge in accurate identification of anomaly based on the sensor data alone.

SUMMARY

Embodiments of the present disclosure present technological improvements as solutions to one or more of the above-mentioned technical problems recognized by the inventors in conventional systems. For example, in one embodiment, a system for industrial anomaly detection is provided. The system includes a computing device wherein the computing device includes, at least one memory comprising programmed instructions, at least one hardware processor operatively coupled to the at least one memory, wherein the at least one hardware processor is capable of executing the programmed instructions stored in the at least one memories and an anomaly detection unit, wherein the anomaly detection unit is configured to receive, a plurality of multivariate time series data pertaining to an industrial unit. Further, the anomaly detection unit is configured to subset a plurality of key variables from the plurality of multivariate time series data. Further, the anomaly detection unit is configured to segment the multivariate time series data pertaining to the plurality of key variables based on a predefined window size in the temporal direction. Further, the anomaly detection unit is configured to compute a masked time series data by applying a mask on the segmented time series data, wherein the mask corresponds to the presence and absence of data in the segmented multivariate time series data. Further, the anomaly detection unit is configured to construct a feed data by concatenating a plurality of metadata associated with the industrial unit with the masked time series data, wherein the metadata includes qualitative and quantitative data pertaining to the industrial unit. Further, the anomaly detection unit is configured to compute a reconstructed data corresponding to the masked time series data by utilizing a pre-trained machine learning architecture, wherein the pre-trained machine learning architecture is selected based on a model recommendation. Further, the anomaly detection unit is configured to compute a reconstruction error matrix based on the masked time series data and the reconstructed data, wherein a reconstruction error associated with a missing data is removed by utilizing the mask. Furthermore, the anomaly detection unit is configured to compute a mean reconstruction error associated with each of the plurality of sensors in the temporal direction. Finally, the anomaly detection unit is configured to detect an anomaly associated with each of the plurality of key variables based on the corresponding mean reconstruction error, wherein the mean reconstruction error is compared with a corresponding predetermined mean reconstruction error threshold.

In another aspect, a method for industrial anomaly detection is provided. The method includes receiving, by a one or more hardware processors, a plurality of multivariate time series data pertaining to an industrial unit. Further, the method includes subsetting, by the one or more hardware processors, a plurality of key variables from the plurality of multivariate time series data. Further, the method includes segmenting, by the one or more hardware processors, the multivariate time series data pertaining to the plurality of key variables based on a predefined window size in the temporal direction. Further, the method includes computing, by the one or more hardware processors, a masked time series data by applying a mask on the segmented time series data, wherein the mask corresponds to the presence and absence of data in the segmented multivariate time series data. Further, the method includes constructing, by the one or more hardware processors, a feed data by concatenating a plurality of metadata associated with the industrial unit with the masked time series data, wherein the metadata includes qualitative and quantitative data pertaining to the industrial unit. Further, the method includes computing, by the one or more hardware processors, a reconstructed data corresponding to the masked time series data by utilizing a pre-trained machine learning architecture, wherein the pre-trained machine learning architecture is selected based on a model recommendation. Further, the method includes computing, by the one or more hardware processors, a reconstruction error matrix based on the masked time series data and the reconstructed data, wherein a reconstruction error associated with a missing data is removed by utilizing the mask. Furthermore, the method includes computing, by the one or more hardware processors, a mean reconstruction error associated with each of the plurality of sensors in the temporal direction. Finally, the method includes detecting, by the one or more hardware processors, an anomaly associated with each of the plurality of key variables based on the mean reconstruction error, wherein the mean reconstruction error is compared with a corresponding predetermined mean reconstruction error threshold.

In yet another aspect, a computer program product comprising a non-transitory computer-readable medium having the anomaly detection unit is configured to embodied therein a computer program for method and system for industrial anomaly detection is provided. The computer readable program, when executed on a computing device, causes the computing device to receive a plurality of multivariate time series data pertaining to an industrial unit. Further, the computer readable program, when executed on a computing device, causes the computing device to a subset plurality of key variables from the plurality of multivariate time series data. Further, the computer readable program, when executed on a computing device, causes the computing device to segment the multivariate time series data pertaining to the plurality of key variables based on a predefined window size in the temporal direction. Further, the computer readable program, when executed on a computing device, causes the computing device to compute a masked time series data by applying a mask on the segmented time series data, wherein the mask corresponds to the presence and absence of data in the segmented multivariate time series data. Further, the computer readable program, when executed on a computing device, causes the computing device to construct a feed data by concatenating a plurality of metadata associated with the industrial unit with the masked time series data, wherein the metadata includes qualitative and quantitative data pertaining to the industrial unit. Further, the computer readable program, when executed on a computing device, causes the computing device to compute a reconstructed data corresponding to the masked time series data by utilizing a pre-trained machine learning architecture, wherein the pre-trained machine learning architecture is selected based on a model recommendation. Further, the computer readable program, when executed on a computing device, causes the computing device to compute a reconstruction error matrix based on the masked time series data and the reconstructed data, wherein a reconstruction error associated with a missing data is removed by utilizing the mask. Furthermore, the computer readable program, when executed on a computing device, causes the computing device to compute a mean reconstruction error associated with each of the plurality of sensors in the temporal direction. Finally, the computer readable program, when executed on a computing device, causes the computing device to detect an anomaly associated with each of the plurality of key variables based on the corresponding mean reconstruction error, wherein the mean reconstruction error is compared with a corresponding predetermined mean reconstruction error threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for industrial anomaly detection. The system for industrial anomaly detection provides an accurate anomaly detection in the industrial environment. Here, an error due to imputation of missing data is avoided by utilizing a mask. Further, the accuracy is improved by utilizing metadata along with actual data for anomaly detection. Furthermore, the system for industrial anomaly detection provides a model recommendation system by utilizing transfer learning. An implementation of the method and system for industrial anomaly detection is described further in detail with reference to FIGS. 1 through 5B.

Referring now to the drawings, and more particularly to FIG. 1 through 5B, where similar reference characters denote corresponding features consistently throughout the figures, there are shown preferred embodiments and these embodiments are described in the context of the following exemplary system and/or method.

Figure 1:
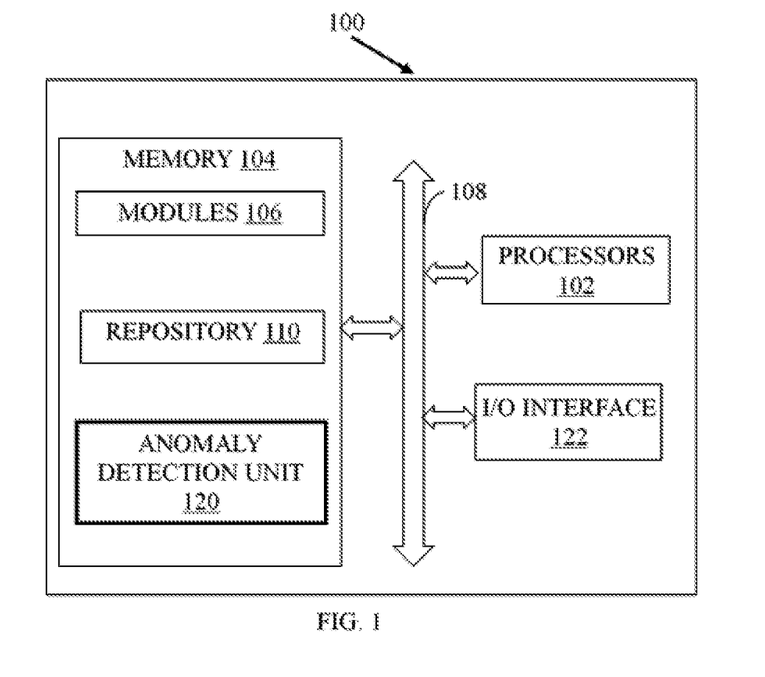
FIG. 1 is a functional block diagram of a system for industrial anomaly detection, according to some embodiments of the present disclosure.

FIG. 1 illustrates a functional block diagram of a system 100 for industrial anomaly detection, according to some embodiments of the present disclosure. The system 100 includes or is otherwise in communication with one or more hardware processors, such as a processors 102, at least one memory such as a memory 104, an I/O interface 122. The memory 104 may include an anomaly detection unit 120. In an embodiment, the anomaly detection unit 120 includes a key variable extraction module (not shown in FIG. 1), masked time series data computation module (not shown in FIG. 1), a reconstructed data computation module (not shown in FIG. 1) and a mean reconstruction error computation module (not shown in FIG. 1). The processor 102, memory 104, and the I/O interface 122 may be coupled by a system bus such as a system bus 108 or a similar mechanism.

The I/O interface 122 may include a variety of software and hardware interfaces, for example, a web interface, a graphical user interface, and the like. The interface 122 may include a variety of software and hardware interfaces, for example, interfaces for peripheral device(s), such as a keyboard, a mouse, an external memory, a plurality of sensor devices, a printer and the like. Further, the interface 122 may enable the system 100 to communicate with other devices, such as web servers and external databases.

The interface 122 can facilitate multiple communications within a wide variety of networks and protocol types, including wired networks, for example, local area network (LAN), cable, etc., and wireless networks, such as Wireless LAN (WLAN), cellular, or satellite. For the purpose, the interface 122 may include one or more ports for connecting a number of computing systems with one another or to another server computer. The I/O interface 122 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a repository 110 for storing data processed, received, and generated by one or more of the modules 106 and the image analysis unit 120. The modules 106 may include routines, programs, objects, components, data structures, and so on, which perform particular tasks or implement particular abstract data types.

The memory 104 also includes module(s) 106 and a data repository 110. The module(s) 106 include programs or coded instructions that supplement applications or functions performed by the system 100 for industrial anomaly detection. The modules 106, amongst other things, can include routines, programs, objects, components, and data structures, which perform particular tasks or implement particular abstract data types. The modules 106 may also be used as, signal processor(s), state machine(s), logic circuitries, and/or any other device or component that manipulates signals based on operational instructions. Further, the modules 106 can be used by hardware, by computer-readable instructions executed by a processing unit, or by a combination thereof. The modules 106 can include various sub-modules (not shown). The modules 106 may include computer-readable instructions that supplement applications or functions performed by the system 100 for industrial anomaly detection.

The data repository 110 may include received multivariate time series data from the plurality of sensors, data pertaining to laboratory experiments, metadata pertaining to an industrial unit and other data. Further, the other data 118 amongst other things, may serve as a repository for storing data that is processed, received, or generated as a result of the execution of one or more modules in the module(s) 106 and the modules associated with the industrial anomaly detection unit 120.

Although the data repository 110 is shown internal to the system 100, it will be noted that, in alternate embodiments, the data repository 110 can also be implemented external to the computing device 100, where the data repository 110 may be stored within a database (not shown in FIG. 1) communicatively coupled to the computing device 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS). In another embodiment, the data stored in the data repository 110 may be distributed between the computing device 104 and the external database (not shown).

The anomaly detection unit 120 of the system 100 can be configured to receive a plurality of multivariate time series data pertaining to an industrial unit. The plurality of multivariate time series data includes data from the plurality of sensors and laboratory data. Further, preprocessing is performed on the multivariate time series data by a data conditioning module, wherein a set of obvious outliers are removed using min-max limit of individual sensor. For example, the obvious outliers are outliers due to sensor malfunctioning. Further, a shutdown period associated with each sensor is identified and removed by utilizing a multilayer perceptron network. In an embodiment, the time line between the sensor data and the laboratory data may vary. The data in varying timeline is normalized, resampled and time synchronized.

Further, the anomaly detection unit 120 of the system 100 can be configured to subset a plurality of key variables from the plurality of multivariate time series data. The plurality of key variables includes exogenous variables and observed variables. The exogenous variables consider the effect of other systems on the concerned system. For example, electric motor and a pump are connected through mechanical shaft and coupling. In an embodiment, for the pump, effect of motor will be taken into account by taking variables like shaft rotational speed and transmitted power (kW). Here, shaft rotational speed and transmitted power variables are known as exogenous variables. In another example, a pump is connected to a heat exchanger. In this case mass flow rate of fluid is the exogenous variable.

Further, the anomaly detection unit 120 of the system 100 can be configured to segment the multivariate time series data pertaining to the plurality of key variables based on a predefined window size in the temporal direction. For example the final window size may be of 1 hour or 1 day depending upon performance on validation dataset. The predefined window size is tuned while training the model.

Further, the anomaly detection unit 120 of the system 100 can be configured to compute a masked time series data by applying a mask on the segmented time series data, wherein each element of the mask corresponds to the presence or absence of data in the segmented multivariate time series data. For example, let the segmented multivariate time series data be [[1, 20, 30, NA, 30, 12, NA, 3], [2, 5, 7, 10, NA, NA, 19, 0.9]], the corresponding mask is [[1, 1, 1, 0, 1, 1, 0, 1], [1, 1, 1, 1, 0, 0, 1, 1]]. Here, "NA" indicates the absence of multivariate time series data from a sensor.

Figure 3A:
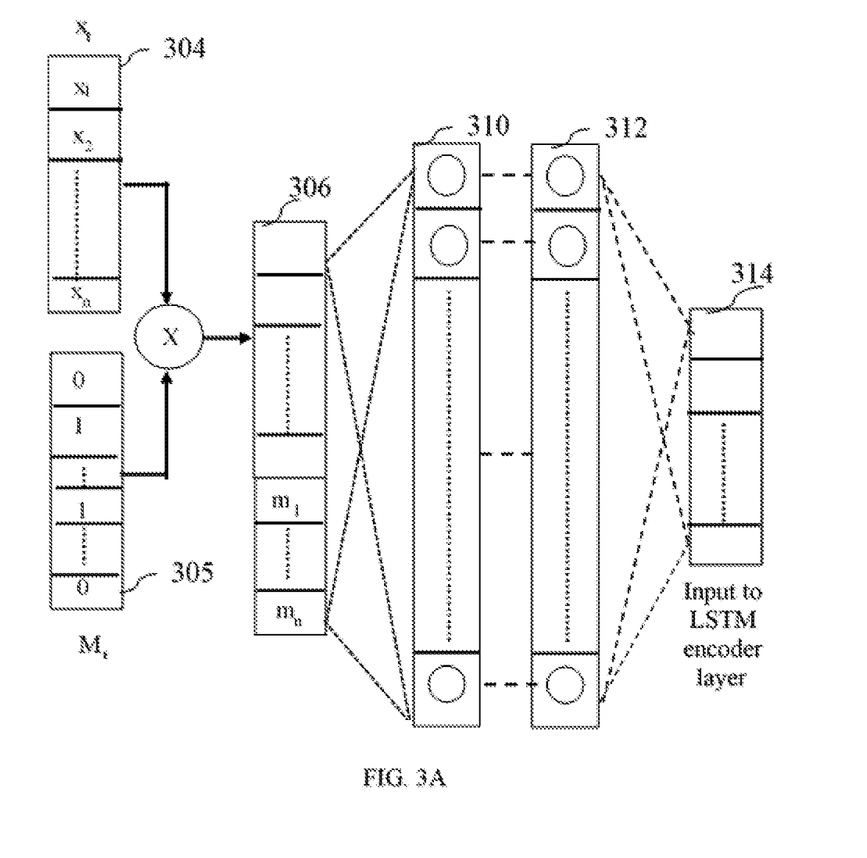
FIGS. 3A and 3B illustrates an example feature extraction block of the pre-trained machine learning architecture, in accordance with some embodiments of the present disclosure.

Further, the anomaly detection unit 120 of the system 100 can be configured to construct a feed data by concatenating a plurality of metadata associated with the industrial unit with the masked time series data as shown in FIG. 3A, wherein the metadata includes a set of qualitative parameters and a set of quantitative parameters pertaining to the industrial unit. For example, the plurality of qualitative parameters for a water pump includes, type of pump (Centrifugal or axial), type of suction (for example, double suction or single suction), single stage or multi-stage, manufacturer's name etc. The plurality of quantitative parameters includes discharge rate, pump diameter etc. Any variation in the quantitative parameters results in slightly different design specification. However, overall operational characteristics will be the same.

Further, the anomaly detection unit 120 of the system 100 can be configured to compute a reconstructed data corresponding to the masked time series data by utilizing a pre-trained machine learning architecture. The pre-trained machine learning architecture is selected based on a model recommendation method. The pre-trained machine learning architecture includes an input feature processing block, a recurrent neural network and a feature reconstruction block, wherein the input feature processing block and feature reconstruction block are multilayer perceptron networks with a plurality of hidden layers or convolutional layers with different number of filters. The pre-trained machine learning architectures are constructed by using historic time series data representing normal operation of industrial units and domain knowledge. The model recommendation method identifies the pre-trained machine learning architecture by mapping the set of quantitative parameters, the set of qualitative parameters and domain knowledge associated with the industrial unit with the set of pre-trained machine learning architectures available in a repository.

Figure 2:
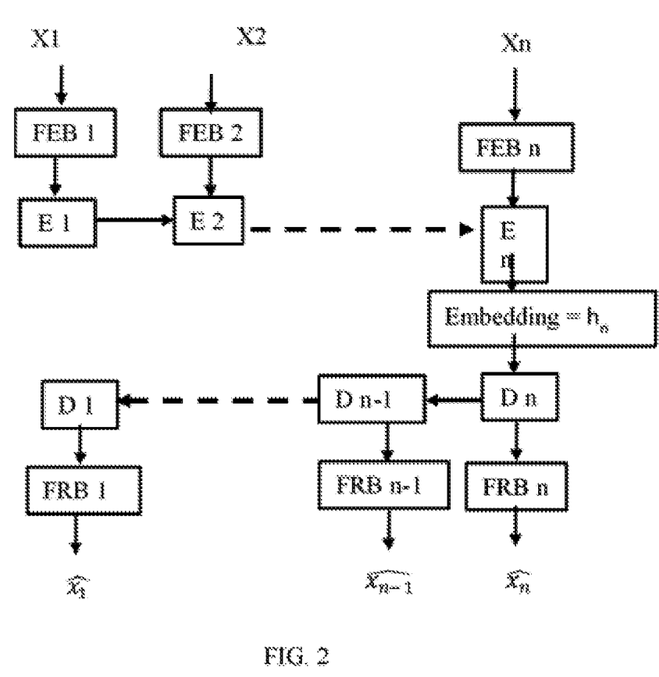
FIG. 2 illustrates an example pre-trained machine learning architecture of a method for industrial anomaly detection, in accordance with some embodiments of the present disclosure.

FIG. 2 illustrates an example pre-trained machine learning architecture of the method for industrial anomaly detection, in accordance with some embodiments of the present disclosure. Now, referring to FIG. 2, the machine learning architecture includes a plurality of Feature Extraction Blocks (FEBs), a plurality of of Encoder blocks (E), a plurality of Decoder blocks (D) and a plurality of Feature Reconstruction Blocks (FRBs). The said blocks are utilized 'n' times in temporal direction. Here, the feed data is provide as input to the FEBs and the features obtained from FEBs are provided as input to the encoder blocks. The encoder block uses recurrent neural network or its variant like LSTM/GRU which learn the temporal and multivariate relationship between input signal as an embedding (Array of real numbers containing information in abstract form). The embedding is provided as input to the decoder blocks and the decoded features are provided as input to the FRBs. In an embodiment, the encoder decoder of the pre-trained machine learning model is an LSTM (Long Short Term Memory) architecture. In another embodiment, the encoder decoder architecture is GRU (Gated Recurrent Unit) architecture.

Figure 3B:
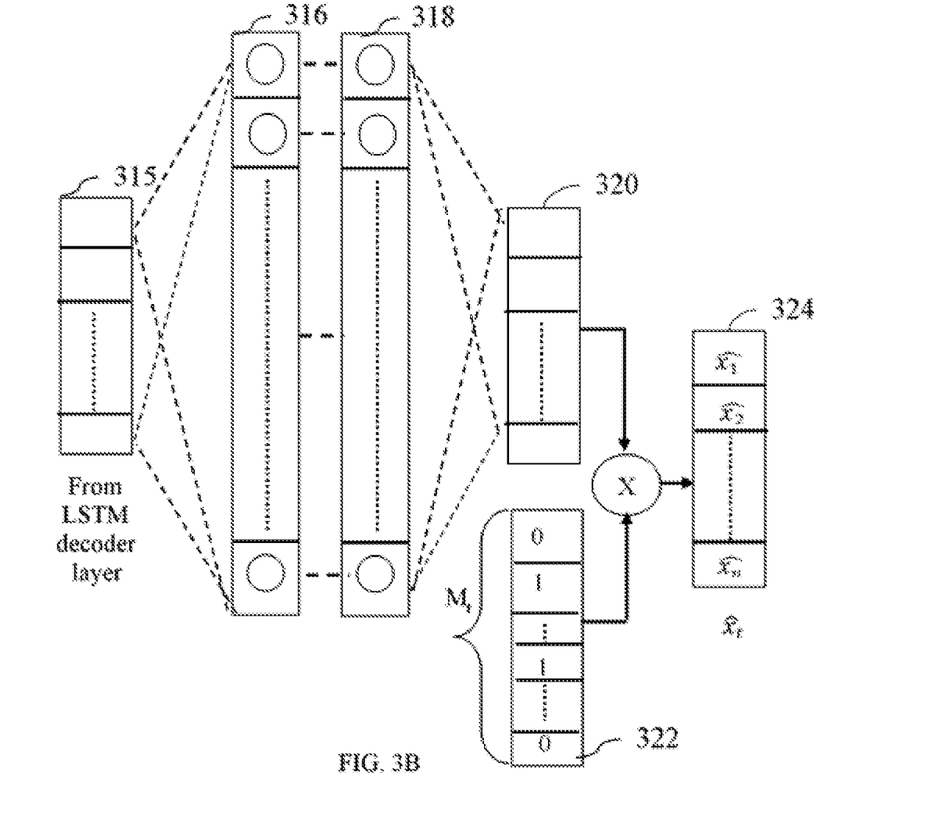

FIGS. 3A and 3B illustrates an example feature extraction module of the pre-trained machine learning architecture of the method for industrial anomaly detection, in accordance with some embodiments of the present disclosure. Now referring to FIG. 3A, the segmented time series data 304 represented as $X_t$ is multiplied with the mask 305 represented as $M_t$ to obtain the masked time series data. The masked time series data is further concatenated with the metadata associated with the industrial unit to obtain the feed data 306. Further, the feed data 306 is fed into the FEBs, wherein the FEB is recurrent neural network with the plurality of hidden layers or convolutional layers, wherein the input layer is 310 and the output layer is 312. The output 314 from the recurrent neural network is fed as input to the LSTM encoder. Now referring to FIG. 3B, the output from the LSTM decoder 315 is further fed into the FRB, wherein the FEB is a recurrent neural network with a plurality of hidden layers or a multilayer perceptron or convolutional layers. The input layer of the REB is 316 and the output layer is 318. Further, the output data 320 from the REBs is multiplied with the mask $M_t$ to obtain the reconstructed data 324 and is given by equation 1. Here, the multiplication of the output data 320 with the mask is performed to avoid the loss or error due to non-available data or absent data.

$$\text{loss} = \sum_{i}^{ns} \frac{\sum_{k=0}^{ls} \{(x_t^i - \hat{x}_t^i)M_t^i\}^2}{\sum_{k=0}^{ls} M_t^i} \quad (1)$$

Where, ns is Number of sensors, ls is sequence length, t is index for timestamps, i is index for sensor, M is mask, x is the masked time series data and $\hat{x}$ is reconstructed vector.

In an embodiment, a manufacturing plant includes a plurality of systems like compressor, turbine, pumps etc. Here, one or more systems may be similar in fundamental design but have different number of sensors. For example— In some smaller turbines, there are 16 combustors so as a result there are 16 Blade Path Temperature (BPT) sensors whereas in some bigger turbines, there are 20 BPT sensors for 20 combustors. Hence, conventionally knowledge gathered by the anomaly detection model made for smaller gas turbine is not being used for making anomaly detection model of bigger gas-turbine. However, the present disclosure utilizes pre-trained model for utilizing the knowledge learnt while training different systems.

Figure 4:
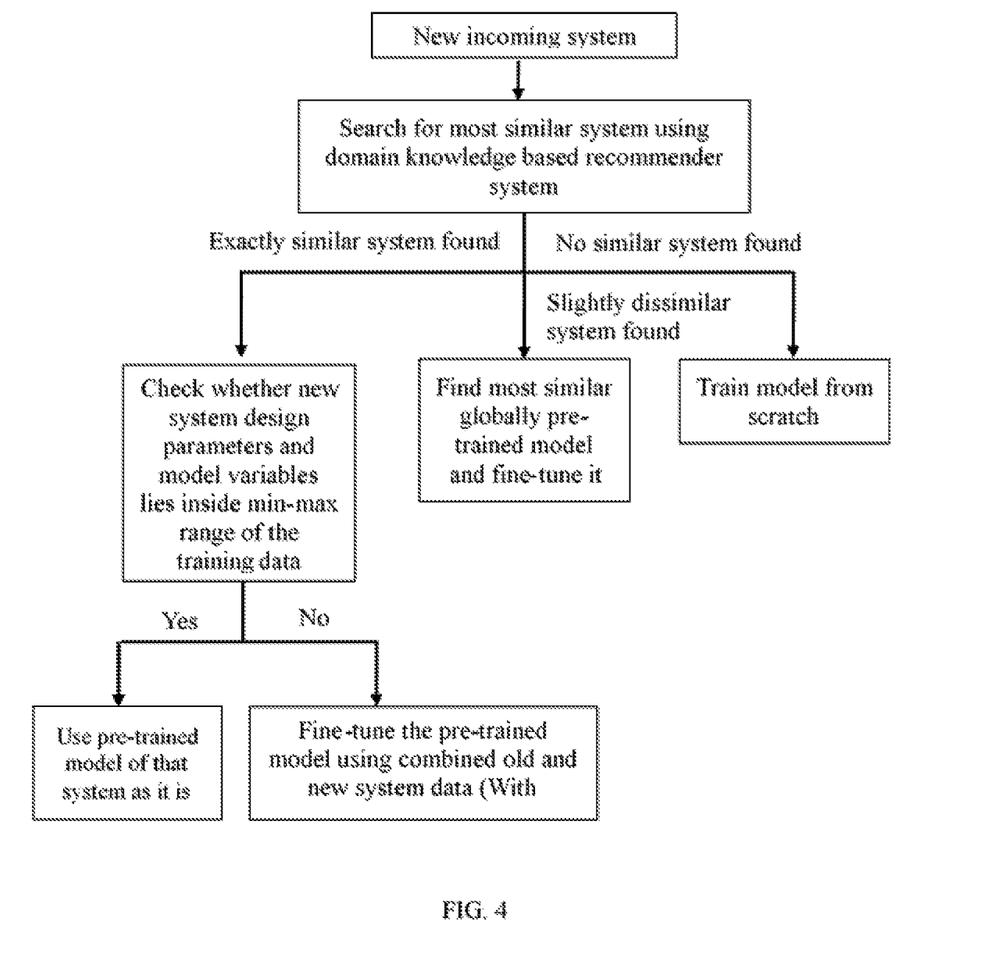
FIG. 4 illustrates an example flow diagram of a model recommendation system of the method for industry anomaly detection, in accordance with some embodiments of the present disclosure.

FIG. 4 illustrates an example flow diagram of a model recommendation method of the system for industry anomaly detection, in accordance with some embodiments of the present disclosure.

In an embodiment, the model recommendation method includes a model repository, wherein the model repository includes a plurality of pre-trained models for different types of systems along with system information. The pre-trained models are built using historical data and pre-trained weights of the model along with the metadata of the system For example, the system can be any type of system associated with an industry. The system information includes a plurality of quantitative and qualitative parameters. For example, the plurality of qualitative parameters for a water pump includes, type of pump (Centrifugal or axial), type of suction (for example, double suction or single suction), single stage or multi-stage, manufacturer's name etc. The plurality of quantitative parameters includes discharge rate, pump diameter etc. Any variation in the quantitative parameters results in slightly different design specification. However, overall operational characteristics will be the same.

In an embodiment, now referring to FIG. 4, when the model recommendation system receives a new system, the most similar system in the model repository is searched by utilizing a domain knowledge based recommender system. The domain knowledge recommender system includes a list of all systems along with the most similar systems in decreasing order of preference. The number of similar systems may be different for various systems. Further, the model recommendation system checks for any exactly similar system is found or a slightly dissimilar system or a new system is found.

In an embodiment, if no similar system is identified, a new anomaly detection model is built from scratch. A proper architecture of the model is found by systematic hyper parameter tuning.

In an embodiment, if a slightly dissimilar system is found, the pre-trained weights of the most similar system are utilized and fine-tuned. Here, a two stage fine-tuning strategy is utilized. A tunable weight is fine tuned in the first stage by keeping weights associated with all other layers as fixed. Further in the second stage, weights are further fine-tuned after minimizing the loss.

In an embodiment, when an exactly similar system found, design parameters and model variables associated with the new system are checked for lying inside min-max range of the corresponding training data of the available pre-trained model. If the design parameters and the model variables lie in the min-max range of the training data, the pre-trained model of the system is utilized as it is. If the design parameters and the disturbance variables lie outside the min-max range of the training data, the pre-trained model is fine-tuned by combining old and new system data with sampling.

Further, the anomaly detection unit 120 of the system 100 can be configured to compute a reconstruction error matrix based on the masked time series data and the reconstructed data, wherein a reconstruction error associated with a missing data is neglected by utilizing the mask. For example, if the input data x is [[1, 0, 7, 3, NA], [3.3, 4.2, NA, 10.4, 3]], corresponding mask M will be [[1, 1, 1, 1, 0], [1, 1, 0, 1, 1]] and reconstructed data $\hat{x}$ is [[1.01, 0.02, 7.02, 2.9, 0.5], [3.2, 4.3, 0.4, 10.35, 2.9]], then the error matrix $(x-\hat{x})*M$ will be [[1, 0, 7, 3, 0], [3.3, 4.2, 0, 10.4, 3]]-[[1.01, 0.23, 7.02, 2.9, 0.5], [3.2, 4.3, 0.4, 10.35, 2.9]]*[[1, 1, 1, 1, 0], [1, 1, 0, 1, 1]]=[[−0.01, −0.23, −0.02, 0.1, 0], [0.1, −0.1, 0, 0.05, 0.1]].

Further, the anomaly detection unit 120 of the system 100 can be configured to compute a mean reconstruction error associated with each of the plurality of sensors in the temporal direction.

Further, the anomaly detection unit 120 of the system 100 can be configured to detect an anomaly associated with each of the plurality of key variables based on the mean reconstruction error, wherein the mean reconstruction error is compared with a corresponding predetermined mean reconstruction error threshold. Every sensor data is associated with a predetermined mean reconstruction threshold.

Figure 5A:
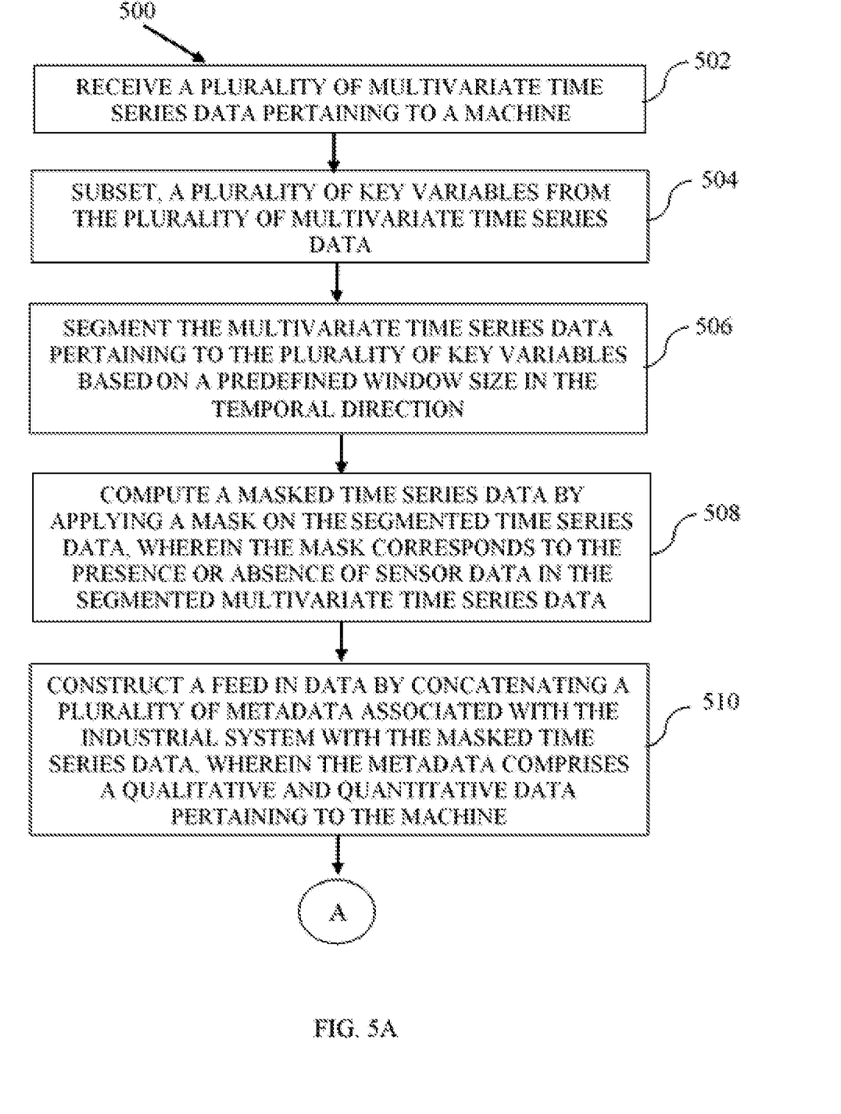
FIGS. 5A and 5B are exemplary flow diagrams for a processor implemented method for industrial anomaly detection, according to some embodiments of the present disclosure.
Figure 5B:
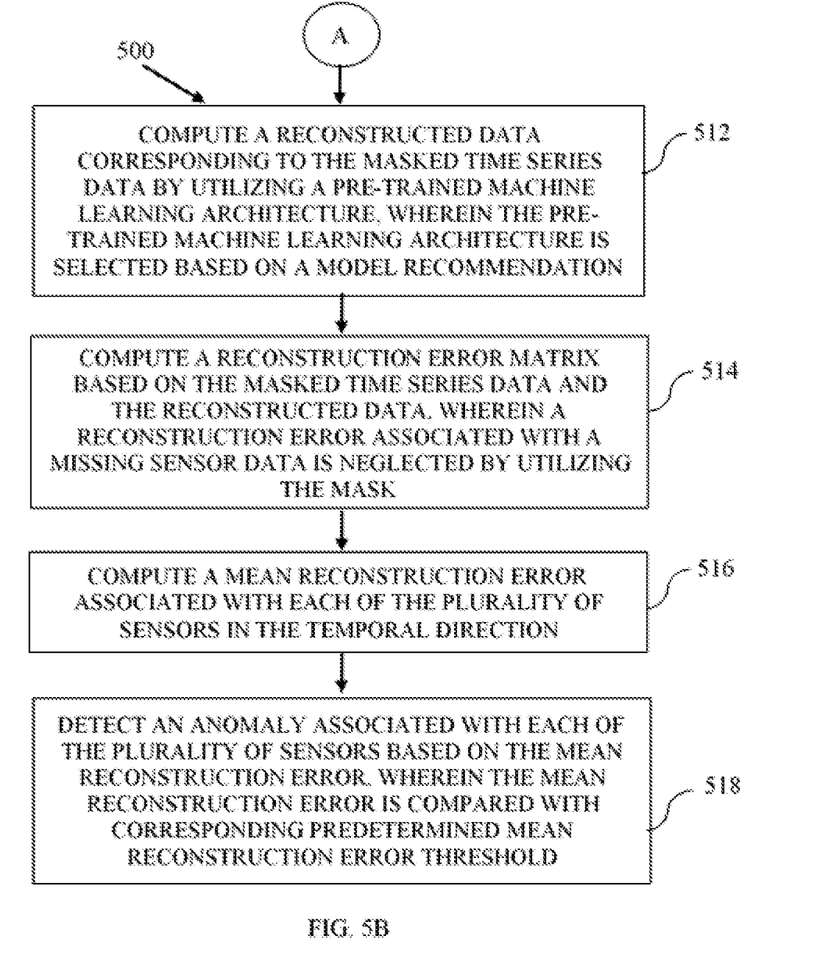

FIGS. 5A and 5B is an exemplary flow diagram for a processor implemented method for industrial anomaly detection, according to some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof.

At 502, the system 100, receives, by a one or more hardware processors, the plurality of multivariate time series data pertaining to an industrial unit. The plurality of multivariate time series data includes sensor data and laboratory data. At 504, the system 100 identifies, by the one or more hardware processors, subsets the plurality of key variables from the plurality of multivariate time series data. The plurality of key variables includes exogenous variables and observed variables. At 506, the system 100 segments, by the one or more hardware processors, the multivariate time series data pertaining to the plurality of key variables based on a predefined window size in the temporal direction. At 508, the system 100, computes by the one or more hardware processors, the masked time series data by applying a mask on the segmented time series data, wherein the mask corresponds to the presence and absence of data in the segmented multivariate time series data. At 510, the system 100 constructs, by the one or more hardware processors, a feed data by concatenating a plurality of metadata associated with the industrial unit with the masked time series data, wherein the metadata includes qualitative and quantitative data pertaining to the industrial unit. At 512, the system 100 computes, by the one or more hardware processors, a reconstructed data corresponding to the masked time series data by utilizing a pre-trained machine learning architecture, wherein the pre-trained machine learning architecture is selected based on a model recommendation. The pre-trained machine learning architecture includes the input feature processing block, the recurrent neural network and the feature reconstruction block, wherein the input feature processing block and feature reconstruction block are multi-layer perceptron networks with a plurality of hidden layers or convolutional layers. The model recommendation method identifies a pre-trained machine learning architecture by mapping the set of quantitative parameters, the set of qualitative parameters and domain knowledge associated with the industrial unit with a set of pre-trained machine learning architectures available in a repository. The pre-trained machine learning architectures are constructed by using historic time series data representing normal operation of industrial units. At 514, the system 100 computes, by the one or more hardware processors, a reconstruction error matrix based on the masked time series data and the reconstructed data, wherein a reconstruction error associated with a missing data is neglected by utilizing the mask. At 516, the system 100 computes, by the one or more hardware processors, a mean reconstruction error associated with each of the plurality of sensors in the temporal direction. The mean reconstruction error threshold is calculated using validation dataset. At 518, the system 100 detects, by the one or more hardware processors, an anomaly associated with each of the plurality of key variables based on the corresponding mean reconstruction error, wherein the mean reconstruction error is compared with a predetermined mean reconstruction error threshold.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of accurate and fast anomaly detection in an industrial environment. Here, the inaccuracy due to absence of a portion of input data is solved by utilizing a masking technique. Further, the system 100 includes the model recommendation system which enables reuse of similar models rather than building a new model from scratch thus reducing time taken to build model. Further, the embodiments of the present disclosure are applicable to one or more unit operations or processes from manufacturing or process industries including iron and steel manufacturing, power generation, manufacturing of pharmacy products, refineries, cement manufacturing, oil and gas production, fine chemical production, automotive production, water treatment plants, mining operations, and the like. The machinery could be any equipment used in the unit operations or processes in manufacturing and process industries, including valves, compressors, blowers, pumps, steam turbines, gas turbines, heat exchangers, chemical reactors, bio-reactors, condensers, distillation units, and boilers.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor implemented method, comprising:
   receiving, by a one or more hardware processors, a plurality of multivariate time series data pertaining to an industrial unit;
   subsetting, by the one or more hardware processors, a plurality of key variables from the plurality of multivariate time series data;
   segmenting, by the one or more hardware processors, the multivariate time series data pertaining to the plurality of key variables based on a predefined window size in the temporal direction;
   computing, by the one or more hardware processors, a masked time series data by applying a mask on the segmented time series data, wherein the mask corresponds to the presence and absence of data in the segmented multivariate time series data;
   constructing, by the one or more hardware processors, a feed data by concatenating a plurality of metadata associated with the industrial unit with the masked time series data, wherein the metadata comprises qualitative and quantitative data pertaining to the industrial unit;
   computing, by the one or more hardware processors, a reconstructed data corresponding to the masked time series data by utilizing a pre-trained machine learning architecture, wherein the pre-trained machine learning architecture is selected based on a model recommendation;
   computing, by the one or more hardware processors, a reconstruction error matrix based on the masked time series data and the reconstructed data, wherein a reconstruction error associated with a missing data is removed by utilizing the mask;
   computing, by the one or more hardware processors, a mean reconstruction error associated with each of the plurality of sensors in the temporal direction; and
   detecting, by the one or more hardware processors, an anomaly associated with each of the plurality of key variables based on the mean reconstruction error, wherein the mean reconstruction error is compared with corresponding predetermined mean reconstruction error threshold.

2. The processor implemented method of claim 1, wherein the pre-trained machine learning architecture comprises an input feature processing block, a recurrent neural network and a feature reconstruction block, wherein the input feature processing block and feature reconstruction block are multilayer perceptron networks with a plurality of hidden layers or convolutional layers.

3. The processor implemented method of claim 1, wherein the plurality of multivariate time series data comprises sensor data and laboratory data.

4. The processor implemented method of claim 1, wherein the plurality of key variables includes exogenous variables and observed variables.

5. The processor implemented method of claim 1, wherein the model recommendation identifies a pre-trained machine learning architecture by mapping a set of quantitative parameters, a set of qualitative parameters and domain knowledge associated with the industrial unit with a set of pre-trained machine learning architectures available in a repository.

6. The processor implemented method of claim 1, wherein the pre-trained machine learning architectures are constructed by using historic time series data representing normal operation of industrial units.

7. The processor implemented method of claim 1, the mean reconstruction error threshold for each sensor is calculated using a validation dataset.

8. A system comprising:
at least one memory storing programmed instructions;
an anomaly detection unit, wherein the industrial anomaly detection unit is configured to:
receive, by the one or more hardware processors, a plurality of multivariate time series data pertaining to an industrial unit;
subset, by the one or more hardware processors, a plurality of key variables from the plurality of multivariate time series data;
segment, by the one or more hardware processors, the multivariate time series data pertaining to the plurality of key variables based on a predefined window size in the temporal direction;
compute, by the one or more hardware processors, a masked time series data by applying a mask on the segmented time series data, wherein the mask corresponds to the presence and absence of data in the segmented multivariate time series data;
construct, by the one or more hardware processors, a feed data by concatenating a plurality of metadata associated with the industrial unit with the masked time series data, wherein the metadata comprises qualitative and quantitative data pertaining to the industrial unit;
compute, by the one or more hardware processors, a reconstructed data corresponding to the masked time series data by utilizing a pre-trained machine learning architecture, wherein the pre-trained machine learning architecture is selected based on a model recommendation;
compute, by the one or more hardware processors, a reconstruction error matrix based on the masked time series data and the reconstructed data, wherein a reconstruction error associated with a missing data is removed by utilizing the mask;
compute, by the one or more hardware processors, a mean reconstruction error associated with each of the plurality of sensors in the temporal direction; and
detect, by the one or more hardware processors, an anomaly associated with each of the plurality of key variables based on the corresponding mean reconstruction error, wherein the mean reconstruction error is compared with a corresponding predetermined mean reconstruction error threshold.

9. The system of claim 8, wherein the pre-trained machine learning architecture comprises an input feature processing block, a recurrent neural network and a feature reconstruction block, wherein the input feature processing block and feature reconstruction block are multilayer perceptron networks with a plurality of hidden layers or convolutional layers.

10. The system of claim 8, wherein the plurality of multivariate time series data comprises sensor data and laboratory data.

11. The system of claim 8, wherein the plurality of key variables includes exogenous variables and observed variables.

12. The system of claim 8, wherein the model recommendation identifies a pre-trained machine learning architecture by mapping a set of quantitative parameters, a set of qualitative parameters and domain knowledge associated with the industrial unit with a set of pre-trained machine learning architectures available in a repository.

13. The system of claim 8, wherein the pre-trained machine learning architectures are constructed by using historic time series data representing normal operation of industrial units.

14. The system of claim 8, mean reconstruction error threshold for individual sensors are calculated using validation dataset.

15. A computer program product comprising a non-transitory computer readable medium having a computer readable program embodied therein, wherein the computer readable program, when executed on a computing device, causes the computing device to:
receive a plurality of multivariate time series data pertaining to an industrial unit;
subset a plurality of key variables from the plurality of multivariate time series data;
segment the multivariate time series data pertaining to the plurality of key variables based on a predefined window size in the temporal direction;
compute a masked time series data by applying a mask on the segmented time series data, wherein the mask corresponds to the presence and absence of data in the segmented multivariate time series data;
construct a feed data by concatenating a plurality of metadata associated with the industrial unit with the masked time series data, wherein the metadata comprises qualitative and quantitative data pertaining to the industrial unit;
compute a reconstructed data corresponding to the masked time series data by utilizing a pre-trained machine learning architecture, wherein the pre-trained machine learning architecture is selected based on a model recommendation;
compute a reconstruction error matrix based on the masked time series data and the reconstructed data, wherein a reconstruction error associated with a missing data is removed by utilizing the mask;
compute a mean reconstruction error associated with each of the plurality of sensors in the temporal direction; and
detect an anomaly associated with each of the plurality of key variables based on the corresponding mean reconstruction error, wherein the mean reconstruction error is compared with a corresponding predetermined mean reconstruction error threshold.

16. The one or more non-transitory machine readable information storage mediums of claim 15, wherein the pre-trained machine learning architecture comprises an input feature processing block, a recurrent neural network and a feature reconstruction block, wherein the input feature processing block and feature reconstruction block are multilayer perceptron networks with a plurality of hidden layers or convolutional layers.

17. The one or more non-transitory machine readable information storage mediums of claim 15, wherein the plurality of multivariate time series data comprises sensor data and laboratory data.

18. The one or more non-transitory machine readable information storage mediums of claim 15, wherein the plurality of key variables includes exogenous variables and observed variables.

19. The one or more non-transitory machine readable information storage mediums of claim 15, wherein the model recommendation identifies a pre-trained machine learning architecture by mapping a set of quantitative parameters, a set of qualitative parameters and domain knowledge associated with the industrial unit with a set of pre-trained machine learning architectures available in a repository.

20. The one or more non-transitory machine readable information storage mediums of claim 15, wherein the pre-trained machine learning architectures are constructed by using historic time series data representing normal operation of industrial units.

\* \* \* \* \*